United States Patent [19]

Buret

[11] 3,857,951

[45] Dec. 31, 1974

[54] USE OF 2-MERCAPTOPROPIONYLGLYCINE AND ITS ALKALI METAL SALTS IN TREATING RESPIRATORY DISEASES

[75] Inventor: Jean-Pierre Buret, Osny, France

[73] Assignee: Laboratories Cassenne, Paris, France

[22] Filed: Sept. 14, 1973

[21] Appl. No.: 397,865

[52] U.S. Cl. .............................................. 424/319
[51] Int. Cl. ........................................... A61k 27/00
[58] Field of Search .................................... 424/319

[56] References Cited
FOREIGN PATENTS OR APPLICATIONS
1,491,204   8/1962   France
3,081M     10/1962   France
1,114,313   5/1968   Great Britain ...................... 424/319
964,989     7/1964   Great Britain ...................... 424/319

Primary Examiner—Stanley J. Friedman
Assistant Examiner—Norman A. Drezin
Attorney, Agent, or Firm—Bacon & Thomas

[57] ABSTRACT

A method for treating respiratory diseases in man or animals comprising administering thereto a mucolytically effective amount of 2-mercaptopropionylglycine or one of its alkali metal salts.

8 Claims, No Drawings

USE OF 2-MERCAPTOPROPIONYLGLYCINE AND ITS ALKALI METAL SALTS IN TREATING RESPIRATORY DISEASES

This invention has as its object a new method for treating mucuses characterized in that 2-mercaptopropionylglycine or its alkaline salts are administered for this purpose.

2-Mercaptopropionylglycine, which corresponds to the following formula:

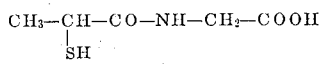

is described in French Pat. No. 1,491,204 to the extent of its chemical makeup. The alkaline salts of 2-mercaptopropionylglycine are also known.

2-Mercaptopropionylglycine can be prepared according to the process of the Santen Pharmaceutical Company Ltd. French Pat. No. 1,491,204. The alkaline salts can be prepared by salification of 2-mercaptopropionylglycine.

By alkaline salts is meant the salts of sodium, potassium or lithium.

The process for preparing the 2-mercaptopropionylglycine consists of reacting thionyl chloride with 2-benzylmercaptopropionic acid to obtain, after elimination of excess thionyl chloride, the chloride of 2-benzylmercaptopropionic acid. The chloride of 2-benzylmercaptopropionic acid is then condensed with glycine to give 2-benzylmercaptopropionylglycine and the latter compound is reduced with sodium metal in the presence of liquid ammonia. The 2-mercaptopropionylglycine thus obtained can be purified and salified.

The pharmacological properties of 2-mercaptopropionylglycine and its alkaline salts have already been described in the literature. French special medicament patent 3081 M discloses, for example, that 2-mercaptopropionylglycine can be utilized in the prevention or treatment of certain kinds of poisoning by heavy metals, in the treatment of hepatitis, dermatitis and eczema. 2-Mercaptopropionylglycine has also been used as an antidote for certain venoms.

It has now been found that 2-mercaptopropionylglycine and its alkaline salts possess other pharmacological properties of great interest, notably a remarkable power of fluidifying with respect to mucus coming from the rhinopharyngeal and tracheobronchial mucous membranes. This activity is absolutely not suggested by the activities of these substances which are already described.

The present application has as its basic object a method of treating respiratory diseases, characterized by the administration as a mucolytic to man or animal, of a sufficient quantity of a compound selected from the group consisting of 2-mercaptopropionylglycine and its alkaline salts.

Among the alkaline salts the sodium salt of 2-mercaptopropionylglycine is preferred.

By reason of their remarkable power to fluidify mucus coming particularly from the rhinopharyngeal and tracheobronchial mucous membranes illustrated below in the experimental portion, 2-mercaptopropionylglycine and its sodium salt can be used to lessen the viscosity of the mucus and mucopurulent secretions in the treatment of bronchitis, rhinitis, rhinopharyngitis and sinusitis, to dissolve the mucus (plugs) that obstruct the bronchia, in the treatment of respiratory insufficiencies, and in all the syndromes of hypersecretion and blockage of the various air passages.

2-Mercaptopropionylglycine and its alkaline salts can be administered through the digestive tract (orally), by parenteral means or by direct contact with the rhinopharyngeal and tracheobronchial mucous membranes. The daily dosage can be, for example, between 100 to 500 mg taken orally by a human.

The pharmaceutical compositions containing 2-mercaptopropionylglycine or its alkaline salts can be either solid or liquid and can be used in the forms currently used in human medicine, as for example, compressed tablets, simple or lozenges, gelatin capsules, syrups, suspensions, suppositories, injectible preparations, nasal drops, or aerosols; these are prepared in accordance with the usual methods. 2-Mercaptopropionylglycine or its alkaline salts can be incorporated with the excipients usually used in pharmaceutical compositions, such as talc, gum arabic, lactose, starch, magnesium stearate, aqueous or non-aqueous vehicles, various moistening, dispersing or emulsifying agents, or preservatives.

There has thus been prepared, for example, tablets dosed with 100 mg of 2-mercaptopropionylglycine, an aqueous injectible solution dosed with 100 mg of the sodium salt of 2-mercaptopropionylglycine and suppositories dosed with 300 mg of the sodium salt of 2-mercaptopropionylglycine.

PHARMACOLOGICAL STUDY

In Vitro Determination of the Fluidifying Power

The determination of the fluidifying power is effected by means of an Ostwald viscosimeter.

The fluidification of the mucus is determined at 37°C by the change of the duration of flow of the specimen of mucus, treated or not, across a calibrated capillary. The substratum serving in the determination is formed by a homogeneous batch of reconstituted mucus coming from pathological, lyophilized human expectorations. The powdered lyophilisat is rehydrated to obtain a mucus reconstituted with 3% of the dry material (average value observed with fresh expectorations). The reconstituted mucus is then diluted by the addition of distilled water in a ratio of 5 volumes of water to 4 volumes of mucus. One obtains a homogeneous translucent gel. 4.5 cm³ of this gel is introduced into the reservoir of the viscosimeter submerged in a bath at 37°C. The duration of flow of the specimen is measured periodically until a stable and reproducible value is obtained. The value t°M expressed in seconds is then determined (a value representative of the untreated mucus).

One then adds into the visosimeter 0.5 cm³ of a solution of a composition to be tested and determines after homogenization, every 5 minutes, the duration of flow of the treated mucus until stabilization of the results (being about 40 minutes after the addition of the composition); the latter result is expressed by t'M.

One is then able to determine the percentage of relative fluidification, which is given by the equation:

$$100 - [(t'M - tW)/(t°M - tW)] \times 100$$

where tW is the duration of the flow of water, expressed in seconds, at 37°C in the viscosimeter utilized.

The percentage of fluidification with 2-mercaptopropionylglycine and the sodium salt of the 2-mercaptopropionylglycine have been determined and the results compared with the percentage of fluidification determined under the same conditions with the pharmaceutical forms of two products possessing the same type of activity; namely, with pharmaceutical forms containing, respectively, N-acetylcysteine and S-carboxymethylcysteine. The results obtained appear in the following table The sodium salt of 2-mercaptopropionylglycine was administered to adults intravenously in the form of ampoules containing 100 mg of the active principle in 2 $cm^3$ of solvent. 2-Mercaptopropionylglycine was administered to adults orally in the form of pills containing 100 mg of the active principle.

The sodium salt of 2-mercaptopropionylglycine was also administered to children in the form of a syrup for pediatric use (125 mg of the active principle for 125 $cm^3$ of syrup) and in aerosol form (ampoules of 5 $cm^3$ containing 4% of the active principle).

| Experimental product | pH | concentration | % of fluidification at x mins. |
|---|---|---|---|
| 2-mercaptopropionylglycine | 3.06 | 0.03 M | 92.57 at 35 mins. |
| | 3.55 | 0.01 M | 84.6 at 40 mins. |
| Sodium salt of 2-mercaptopropionylglycine | 7 | 0.1 M | 93.9 at 40 mins. |
| | 7 | 0.03 M | 84.6 at 40 mins. |
| | 7 | 0.01 M | 72.1 at 40 mins. |
| N-acetylcysteine | 7 | 0.01 M | 65.2 at 40 mins. |
| S-carboxymethylcysteine | 7 | 0.1 M | 63.2 at 35 mins. |

These results demonstrate particularly that the sodium salt of 2-mercaptopropionylglycine is much more active than S-carboxymethylcysteine.

The following clinical observations illustrate the practice of the invention.

The resulting observations with respect to the adults and children are incorporated respectively in Tables A and B below:

TABLE A

| Subject | Sex | Age | Diagnosis | Posology | Results | Tolerance | Conclusion |
|---|---|---|---|---|---|---|---|
| A | Male | 73 | Showed acute respiratory insufficiency in a chronic bronchitis, marked emphysema. | i.v. 3 amp/day dosed with 100 mg for 8 days | good | good | very good effect on expectoration which has increased in volume; it is fluidified. |
| B | Male | 55 | *Asthma complicated with chronic bronchitis. Dusty lungs. (The man was a miner and then a founder). | i.v. 3 amp/day dosed with 100 mg for 7 days | fairly good on expectoration. | good | distinct increase of bronchial secretion |
| C | Male | 68 | Large chronic respiratory insufficiency. | i.v. 3 amp/day dosed with 100 mg for 9 days | very good expectoration. Fairly good clinically. | excellent | important increase in expectoration |
| D | Male | 63 | Emphysema. Major obstructive syndrome. Chronic bronchitis. | i.v. 2 amp/day dosed with 100 mg for 10 days | good | excellent | efficacy satisfactory, fluidification increase, then drying up |
| E | Male | 74 | *Chronic respiratory insufficiency, post tuberculosis. Right thoracotomy of seven ribs. | i.v. 1 amp/day for 5 days then 2 amp/day for 5 days (dosed with 100 mg) | good expectoration, clearly easier to throw up | excellent | facilitation of expectoration, renewal of certain activity |
| F | Female | 63 | chronic bronchitis, insufficient respiratory having need for tracheotomy, by other means, acute glaucoma operated on | i.v. 2 amp/day for 5 days then 3 amp/day for 5 days (dosed with 100 mg) | good | excellent | increase in expectoration, then fluidification |
| G | Male | 68 | chronic bronchitis old tuberculosis, chronic respiratory insufficiency, right ventricular insufficiency, tracheotomy. | i.v. 1 amp/day for 10 days (dosed at 100 mg | good | excellent | fluidification |
| H | Female | 72 | Slight respiratory insufficiency, former asthmatic, onset of moderate congestion | p.o. 3 pills/day for 30 days | good | good | efficacy satisfactory, distinct increase of expectoration which is fluidized |
| I | Male | 52 | Emphysema and chronic bronchitis | p.o. 3 pills/day for 30 days | fairly good | good | efficacy satisfactory |
| J | Male | 48 | Chronic bronchitis. Tabagism | p.o. 3 pills/day for 30 days | good | good | fluidification and increase of expectoration |
| K | Male | 49 | Emphysema, chronic bronchitis | p.o. 3 pills/day for 30 days | fairly good | good | results satisfactory upon morning expectoration |

TABLE B

| Subject | Age | Weight | Diagnosis | Posology | Results | Tolerance | Conclusion |
|---|---|---|---|---|---|---|---|
| 1 | 11 months | 8 kg | Dyspneic bronchitis, purulent rhinitis | syrup, 1 coffee spoon twice a day + aerosol | good | excellent | |
| 2 | 21 months | 7 kg | major hypotrophy in stature and in weight | syrup, 1 coffee spoon twice a day | fairly good | excellent | |
| 3 | 6 years | 20 kg | measles | syrup, 2 coffee spoon twice a day | good | excellent | no complications of the measles |
| 4 | 5 years + 6 months | 15 kg | recent viral pneumonia | syrup, 1 coffee spoon three times a day + aerosol | good | excellent | good results with syrup and aerosol treatment |
| 5 | 5 years+ 6 months | 15 kg | Repeating O.R.L. infection. Convalescence of broncho-pneumonopathy and angina. | syrup, 1 coffee spoon 3 times a day | fairly good | excellent | |
| 6 | 7 months | 5 kg | rhinopharyngitis. Major retardation in stature and in weight | one aerosol session each day | good | excellent | |

What is claimed is:

1. A method of producing a mucolytic effect in a patient having a respiratory disease which comprises administering to said patient a mucolytically effective amount of a compound selected from the group consisting of 2-mercaptopropionylglycine and its sodium, potassium and lithium salts.

2. The method of claim 1 in which the compound is the sodium salt of 2-mercaptopropionylglycine.

3. The method of claim 1 wherein the compound is administered orally.

4. The method of claim 1 wherein the compound is administered parenterally.

5. The method of claim 1 wherein the compound is administered by contact with the rhinopharyngeal and tracheobronchial mucous membranes.

6. The method of claim 3, wherein the effective amount is between 100-500 mg. daily.

7. The method of claim 1, wherein said 2-mercaptopropionylglycine is incorporated with a pharmaceutical excipient.

8. The method of claim 2, wherein the effective amount is between 100-500mg. administered orally.

* * * * *